United States Patent

Grguric et al.

[15] 3,687,161

[45] Aug. 29, 1972

[54] QUICK CONNECT VALVE COUPLING

[72] Inventors: Robert M. Grguric, Parma; Emerson J. Wasen, Cleveland, both of Ohio

[73] Assignee: The Hansen Manufacturing Company, Cayahoga County, Ohio

[22] Filed: June 1, 1970

[21] Appl. No.: 41,991

[52] U.S. Cl. ......... 137/614, 137/614.02, 137/614.05
[51] Int. Cl. .............................................. F16l 37/28
[58] Field of Search .......... 137/614, 614.04, 614.06, 614.01, 137/614.02, 614.03, 614.05

[56] References Cited

UNITED STATES PATENTS

| | | | |
|---|---|---|---|
| 3,187,773 | 6/1965 | Braunberger | 137/614.04 |
| 3,052,488 | 9/1962 | Bruning | 137/614.04 |
| 634,537 | 10/1899 | McDermott | 137/614.05 |
| 3,490,491 | 1/1970 | Kopaska | 137/614.05 |
| 3,448,760 | 6/1969 | Cranage | 137/614.05 |
| 1,799,433 | 4/1931 | Murphy | 137/614.05 |
| 3,336,944 | 8/1967 | Anderson | 137/614.04 |
| 3,460,801 | 8/1969 | Norton | 137/614.04 |
| 3,289,700 | 12/1966 | Gildone | 137/614.04 |

*Primary Examiner*—M. Cary Nelson
*Assistant Examiner*—William H. Wright
*Attorney*—Yount and Tarolli

[57] ABSTRACT

A quick connect coupling having a socket portion adapted to be attached to a disposable beverage container with the parts of the socket being fabricated from two different plastics, one being flexible and the other rigid. The socket includes valving and a novel socket end connector sleeve which cooperates with a male plug that has both a plug valve and a check valve therein. The connector sleeve is retained on the socket body by cooperating interengaging ridges on both the sleeve and the body whereby the sleeve may be nonrotatably assembled. The connector sleeve further includes an integral portion which functions as a socket valve seat.

10 Claims, 4 Drawing Figures

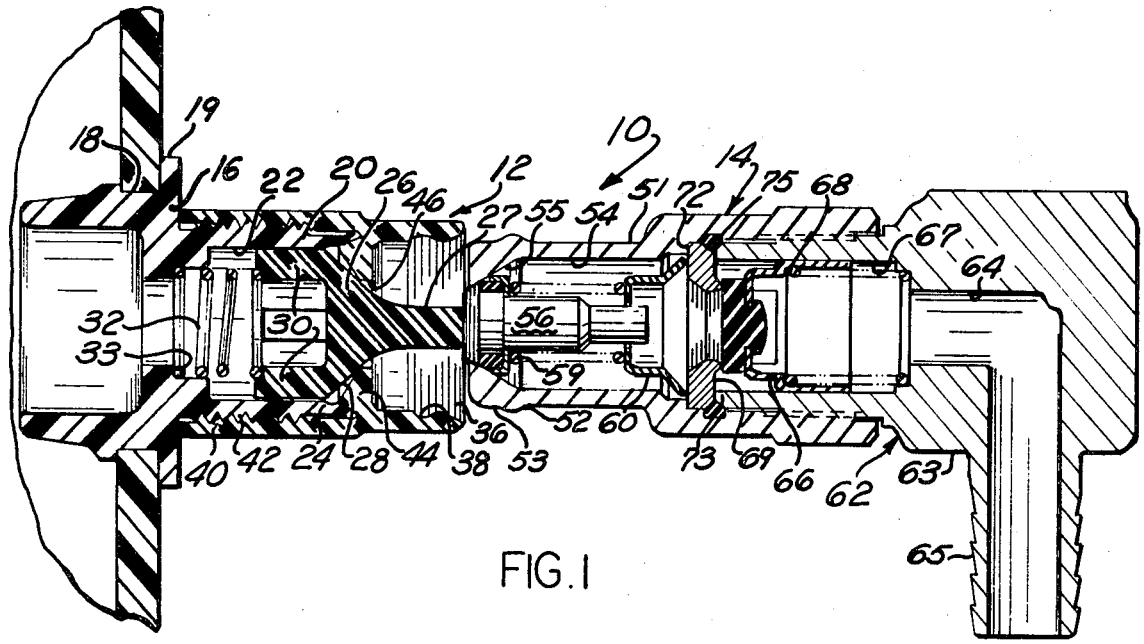
FIG.1
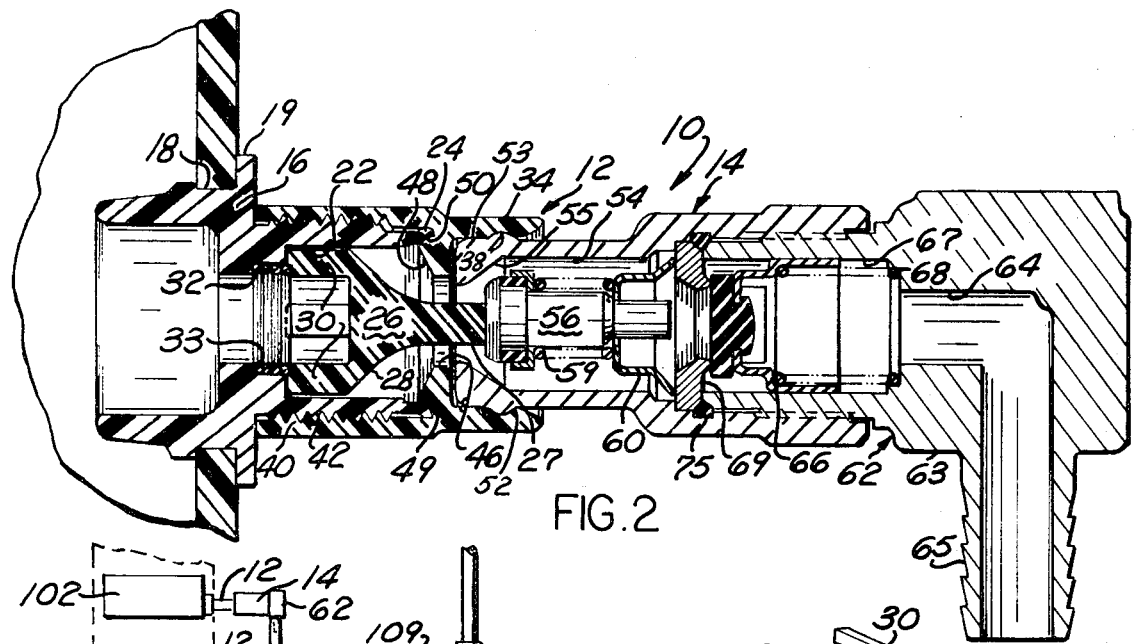
FIG.2
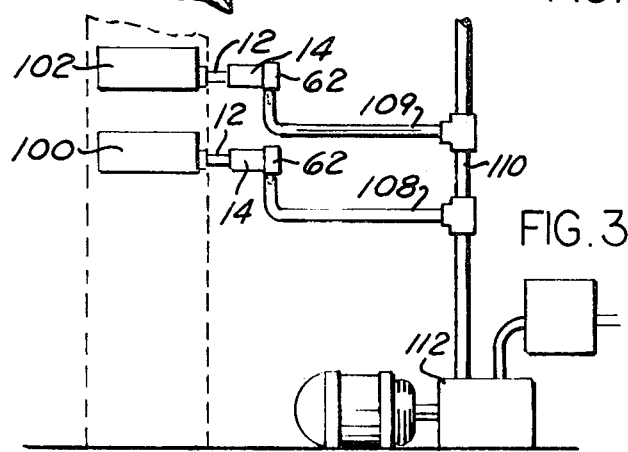
FIG.3
FIG.4
INVENTORS
ROBERT M. GRGURIC
EMERSON J. WASEN
BY Yount and Tarolli
ATTORNEYS

QUICK CONNECT VALVE COUPLING

This invention relates to quick connect couplings and, more particularly, to a coupling specifically adapted for use in beverage dispensing systems or the like.

Although the invention will be described with particular reference to a coupling for use in a beverage dispensing system, it is to be appreciated that many aspects of the invention have broader application and may be used in quick connect couplings for more general applications.

It has been suggested recently that the syrup used for the mixing of soft drink beverages be bulk packaged in disposable plastic containers. It also has been suggested in connection with the disposable packaging approach to employ quick connect couplings which would enable the user to quickly disconnect and remove an empty container and replace it with a new filled container. Moreover, it has been suggested that a plurality of disposable containers might be connected into a single dispensing system by appropriate quick connect couplings so that as the syrup supply in one container is depleted, the supply in another container is automatically available for dispensing.

The development of a suitable quick connect coupling for use in a beverage dispensing system in which disposable containers are to be employed has posed certain problems. For example, it is desirable that the container include a coupling socket which is sufficiently inexpensive that it can be included as an integral part of the container and thrown away with the container. Moreover, the coupling must be fabricated from a material which is compatible with the dispensing of beverages for human consumption. Still further, the coupling must be so designed that the relatively viscous syrup will readily flow through the coupling at a flow rate compatible with the beverage dispensing system in which it is to be incorporated.

Still another consideration in the design of a suitable coupling is peculiar to the particular type of beverage dispensing systems that have been proposed. As noted previously, it is contemplated that a plurality of syrup filled containers will be stacked in a support rack with each container connected into the beverage dispensing system. It will be appreciated that, because of the differences of elevation, the syrup in the uppermost container in the rack presents a substantial pressure head relative to the lowermost container so that, when connected in the same system, there is a tendency for the syrup in the upper container to flow into the lower container. This poses a two-fold problem, one being the intermixing of the syrup and the other being the buildup of excessive pressure in the lower container with the attendant possibility of rupture.

It is the principal object of the invention to provide a quick connective coupling which meets each of the foregoing design considerations and which is adapted for use with a disposable container in a beverage dispensing system.

A more specific object of the invention is the provision of an inexpensive quick connect coupling in which either a socket or plug portion is adapted to be connected to a disposable container and disposed of with the container and providing the means for attaching the mating half of a quick connect coupling to the container.

In accordance with a more specific aspect of the invention, there is provided a quick connect socket made principally of plastic and in which a socket end is carried on the socket body with the socket end cooperating with the body and a valve member in the body to provide a sealing relationship therebetween. A specific feature of this sealing relationship is the fabrication of the socket end from a plastic material having a low modulus of elasticity while the socket body and valve are constructed from a plastic material having a substantially higher modulus of elasticity.

Another specific aspect of the invention is the provision of a disposable quick connect socket in which the socket end is rigidly connected to the socket body by a plurality of interengaging ridges carried on the two members.

Still a further aspect of the invention is the provision of a quick connect male plug adapted to cooperate with the quick connect socket body and in which the male plug includes a check valve and a removable check valve seat which performs the dual functions of a valve seat and a spring abutment for the plug valve.

Further aspects, features and advantages of the present invention will be apparent to those skilled in the art to which it relates from the following detailed description of the preferred embodiment described with reference to the accompanying drawings forming a part of the specification and wherein:

FIG. 1 is a cross-sectional view of a quick connective coupling embodying the present invention and showing the parts of the coupling when disconnected.

FIG. 2 is a cross-sectional view similar to FIG. 1 showing the parts of the coupling in a connected position.

FIG. 3 is a schematic illustration of a typical beverage dispensing system in which the quick connect coupling may be employed.

FIG. 4 is a perspective view of the valve member used in the socket connector.

Referring now in detail to the drawings wherein the showings are for the purposes of illustrating a preferred embodiment of the invention only and not for the purposes of limiting the same, there is illustrated in FIG. 1 a quick connect coupling, indicated generally by the reference numeral 10, which embodies a preferred form of the invention. The coupling 10 includes a socket connector 12 and a male plug connector 14 with the male plug 14 being adapted to be releasably received in the socket 12.

Referring now to the specific construction of the socket connector 12, there is provided a socket body 16 of a generally tubular constructuon and which, in the form illustrated, includes a circumferential peripheral groove 18 and flange 19 whereby the socket body may be secured in an opening in a container. The socket body further includes an elongated tubular extension 20 through which a fluid passage or bore 22 opens outwardly of the socket body. The tubular extension 20 includes at its outer extremity an axially projecting reduced diameter nose portion or flange 24 for a purpose to be hereinafter described.

The socket further includes a slidable valve member 26 which is received in the bore 22. As best shown in FIG. 4, the valve member 26 comprises a projecting nose portion 27 which is connected by a rearwardly and radially outwardly tapering surface 28 to a plurality of rearwardly extending legs or fins 30 which loosely cooperate with the annular wall of the bore 22 to locate the valve member 26 in the bore. A spring 32 is located in the bore 22 and acts between an abutment 33 on the socket body and the end of the fins 30 to bias the valve member 26 in a direction outwardly of the tubular extension 20.

A socket connector end 34 is carried by the socket body. The socket connector end comprises a connector sleeve of a generally cylindrical configuration with the sleeve having a socket opening 36 at its outer extremity. The socket opening is adapted to receive the end of the male plug 14 with a recess or groove 38 being adapted to receive and retain a complementary portion on the plug.

The connector sleeve further includes a plurality of concentric, parallel ridges or convolutions 40 formed on the interior thereof with the ridges 40 being adapted to cooperate with similar ridges 42 on the exterior surface of the tubular extension 20 to retain the connector sleeve assembled to the socket body.

The connector sleeve also includes a radially inwardly extending circumferential flange 44. The flange 44 defines an opening 46 through which the nose 27 of the valve member 26 projects. The axially inward radial face of the flange 44 comprises a rearwardly tapering surface 48 which terminates at its radially outer end in a circumferential, axially opening recess 49. The recess 49 includes a tapered surface 50.

The tapered surface 48 on flange 44 forms an angle with the longitudinal axis of the socket which is greater than the corresponding angle defined by the tapering surface 28 on the valve member 26.

The connector sleeve is assembled over the socket body as shown in FIG. 1 with the nose portion 24 on the tubular extension 20 extending into the recess 49. The interior surface of the nose 24 is in camming engagement with the tapered surface 50 thereby providing a sealing engagement at that point. The sleeve is assembled over the socket body merely by passing the sleeve over the tubular extension 20 and forcing the ridges 40 on the sleeve to cam over the corresponding ridges 42 on the tubular extension. As assembled, the ridges 40,42 interfit to engage and maintain the connector sleeve assembled to the socket end. However, should it be desired to remove the connector sleeve, it is possible by applying sufficient pressure to the sleeve to physically pull the sleeve off the end of the socket body. However, the normal gripping engagement of the cooperating ridges 40,42 is more than sufficient to maintain the sleeve assembled to the body when disconnecting the plug from the socket.

The seal between the nose portion 24 and the tapered surface 50 on the connector sleeve has been noted. This seal is one of the two seals formed by the connector sleeve. The other seal is between the tapered surface 48 on the flange 44 and the tapered surface 28 on the valve member 26. As pointed out above, the tapered surface 48 has a sharper taper than that of the surface 28 so that, as assembled, only the radially inner portion of the flange engages the surface 28 on the valve member. Since the valve member 26 is biased by the spring 32, the two surfaces 28 and 48 are maintained in sealing engagement when the coupling halves are not connected.

The materials from which the parts of the socket connector are fabricated are of substantial importance to the invention. It is contemplated that the connector sleeve will be fabricated from a material which is substantially more flexible than the material from which the valve member 26 and the socket body 16 are fabricated. It is preferred that all of the parts of the socket connector be fabricated from a plastic material such as polyethylene although it is to be appreciated that other materials might be employed. One example of a preferred embodiment is to fabricate the connector sleeve from:

Low density polyethylene
Melt Index: 2
Density: 0.917
Modulus of Elasticity: 14,000 to 18,000 psi
Formula: 1005
Supplier: Gulf Oil Company and to form the socket body and valve member from:

High density polyethylene
Melt Index: 6
Density: 0.950
Modulus of Elasticity: 135,000 psi
Formula: SS50–050
Supplier: Allied Chemical Company By fabricating the sleeve from a material having a modulus of elasticity which is substantially less than the modulus of elasticity of the other part of the socket, several desirable results are obtained. In the first place, the increased flexibility of the connector sleeve facilitates assembly of the connector sleeve over the relatively rigid tubular extension 20. Also, the flexibility of the sleeve assists in assembly of the male plug into the socket end 36. Of even more value to the proper functioning of the socket is the sealing relationship between the nose 24, the flange 44 and the valve member 26. These sealing relationships have been previously described but it is to be appreciated that by forming the flange 44 from a relatively flexible material an improved sealing relationship is obtainable. Thus, the spring bias of the valve member coupled with the fluid pressure behind the valve and the relatively rigid material from which the valve is fabricated forces the valve member against the flange and provides for deflection or deformation of the flange thereby assuring a good sealing relationship at that point. In the same manner, the nose 24 on the tubular extension 20 is of a relatively rigid material so that, as assembled, it cammingly engages the tapered surface 50 to thereby assure a good sealing engagement at that point as well. Thus, the combination of a relatively rigid material in engagement with a relatively flexible material assures both a good sealing relationship between the two while at the same time facilitating the assembly of the component parts of the socket.

Turning now to the specific construction of the male plug connector 14, the plug comprises an elongated tubular stem 51. One end 53 of the stem 51 is adapted to be received in the socket opening 36 and carries thereon a circumferential ridge 52 which is adapted to be engaged in the groove 38 in the socket. The stem 51 further includes a central bore 54 which opens through the one end 53 with the stem including a tapered surface 55 which functions as a valve seat adapted to engage a plug valve 56. The valve 56 includes a valve stem 57 on one end of which there is formed a valve member 58. A spring 59 encircles the stem 57 and acts between the valve member 58 and a spider 60 in the bore 54 to bias the valve 58 into sealing engagement with the valve seat surface 55.

Threadedly received within the other end of the stem 51 is a check valve assembly, indicated generally by the reference numeral 62. The valve assembly 62 comprises a valve body 63 which, as shown, includes a through passage 64 and an adaptor 65 for connection to a hose or tubing. The check valve assembly 62 includes a check valve 66 slidably received in a counterbore 67 and biased by a spring 68 to engagement with a valve seat 69. The valve seat comprises an annular valve plate which is seated against a shoulder 72 in the bore 54 of the valve stem 51. The plate 69 is clamped in position against shoulder 72 by the end 73 of the valve body 63. In this assembled relationship of parts, the valve plate 69 not only provides a valve seat for the check valve 66 but also provides a convenient abutment against which the spider 60 and its associated spring 59 may abut. An elastomeric ring 75 provides a seal between the valve plate 69 and the body.

Turning now to the assembly of the male plug in the socket, it will be apparent that insertion of the end 53 of the plug in the socket 36 causes engagement between the nose 27 and the axial face of the valve plate 58. As the plug is inserted, the respective valve members 26 and 56 are moved against the bias of their respective springs 32,59. As the valve member 26 moves axially and compresses the spring 32, the seal between the flange 44 and the valve member is broken thereby permitting the flow of fluid from the container through the socket. In the same manner, the seal between the valve member 58 and the valve seat 55 is also broken so that the fluid may pass from the socket into the bore 54 of the male plug. Depending on the difference in pressures with which the fluid acts against the check valve 66, the check valve will be displaced against the bias of the spring 68 and thereby permit flow out of the coupling into the tube or hose. Upon withdrawal of the male plug from the socket 36, the springs 32 and 59 will immediately bias the valves 26 and 56 back into sealing engagement thereby stopping the flow of liquid.

As noted above, the described quick connect coupling has particular application in a beverage dispensing system and one such system is illustrated in FIG. 3. As there shown, a support rack may be employed to support a plurality of throwaway plastic containers 100,102 of soft drink syrup. Connected to each container is a socket 12. A male plug 14 is inserted in each socket and each plug is then connected to a fluid line 108,109. The fluid lines 108,109 are interconnected to a common line 110 which is in communication with a pump 112 which supplies the fluid to an appropriate dispenser. It will be appreciated that with a system such as that described, the fluid in the container 102 presents a substantial pressure head above that of container 100 and, depending on the number of containers carried in the rack and connected to the line 110, the resulting pressure head can become substantial and the fluid will attempt to flow through the line 108 into the container 100. However, because of the coupling described, the check valve 66 effectively prevents any interflow of fluid between the containers and also isolates each container from any excessive pressures in the system.

It is also to be noted that each of the valves 26, 56 and 66 and their associated valve seats are so designed that they present a minimum restriction to the flow of the syrup as it passes through each valve.

Although for ease of description, the principles of this invention have been set forth in connection with an illustrated preferred embodiment, it is not my intention that either the illustrated embodiment or the terminology employed in describing it is to be limiting inasmuch as variations of these may be made without departing from the spirit of the invention and it is my intention to be limited only by the scope of the appended claims.

Having thus described our invention, we claim:

1. A socket connector for use in a quick connect coupling comprising:
   a socket connector body having a tubular extension projecting therefrom,
   a bore in said body opening outwardly through said tubular extension,
   valve means in said bore for movement longitudinally of said bore, and
   a socket end carried by said socket body,
   said socket end comprising a connector sleeve telescopically assembled to said tubular extension,
   said connector sleeve including socket connector means formed at one end thereof with said socket connector means being adapted for mating cooperation with a complementary portion of the quick connect coupling,
   said connector sleeve further including radially inwardly extending means integral therewith extending into said bore and defining a valve seat cooperating with said valve means to control the flow of fluid through said connector; and
   an axially opening circumferentially continuous recess having a closed interior end formed in said sleeve with the terminal end of said tubular extension being sealingly received in said closed end recess when said sleeve is assembled to said connector body.

2. The socket connector of claim 1 wherein said tubular extension and said connector sleeve have complementary engaging means for nonrotatably assembling said sleeve to said tubular extension.

3. A socket connector for use in a quick connect coupling comprising;
   a socket connector body and including a generally tubular portion,
   a bore in said body opening outwardly through said tubular portion,
   valve means in said bore for controlling the flow of fluid therethrough,
   a socket end carried by said socket body,
   said socket end comprising a connector sleeve having a socket opening formed in one end thereof and adapted to receive a male plug of a quick connect coupling, and
   complementary engaging means comprising circumferential ridges on said tubular portion and said sleeve for non-rotatable telescopic assembly of said sleeve to said tubular portion;

said circumferential ridges on said sleeve being cammed over said ridges on said tubular portion as said sleeve is being assembled and interfitting with said ridges on said tubular portion in the assembled position to retain said sleeve in a fixed telescopic assembled position when said socket connector is used in a quick connect coupling.

4. A disposable valve for use with a disposable fluid carrying container comprising,
   a valve body including a tubular portion,
   a bore in said body opening outwardly through said portion,
   valve means movable longitudinally in said bore,
   sleeve means telescopically assembled to said tubular portion and including a first portion sealingly engaged with said tubular portion and a second portion cooperating with said valve means to control the flow of fluid through said bore,
   said sleeve means being formed from a plastic material having a relatively low modulus of elasticity and said tubular portion and said valve means being formed from a plastic material having a substantially higher modulus of elasticity.

5. The valve of claim 4 and further including complementary engaging means on said tubular portion and said sleeve means for nonrotatable assembly and retention of said sleeve means to said tubular portion.

6. A male plug for a quick connect coupling including a tubular stem and bore opening through one end thereof, a valve seat in said bore and valve means cooperating with said valve seat to close said bore and biasing means acting on said means to bias said valve means into engagement with said valve seat, the improvement comprising:
   a valve body extending into the other end of said tubular stem,
   said valve body including a flow passage therethrough opening into the bore in said tubular stem,
   a valve member slidably received in said through passage,
   a valve seat,
   biasing means acting on said valve member to bias said valve member into engagement with said valve seat whereby fluid may flow through said plug in only one direction.

7. The male plug of claim 6 wherein said valve seat is carried in the bore of said tubular stem.

8. The male plug of claim 7 wherein said valve seat comprises an annular plate,
   a radial shoulder in the bore in said stem,
   said valve plate being clamped between said radial shoulder and the end of said valve body extending into said stem.

9. The male plug of claim 8 wherein said biasing means for said valve means comprises spring means abutting said valve plate.

10. A socket connector for use in a quick connect coupling comprising,
    a socket connector body having a tubular extension projecting therefrom,
    a bore in said body opening outwardly through said tubular extension,
    valve means in said bore, and
    a socket end carried by said socket body,
    said socket end comprising a connector sleeve telescopically assembled to said tubular extension,
    said connector sleeve including radially inwardly extending means integral therewith extending into said bore and defining a valve seat cooperating with said valve means to control the flow of fluid through said connector,
    said connector sleeve being formed from a plastic material having a relatively low modulus of elasticity and said valve means being formed from a plastic material having a substantially higher modulus of elasticity.

* * * * *